US010025581B2

(12) United States Patent
Sugiura et al.

(10) Patent No.: US 10,025,581 B2
(45) Date of Patent: Jul. 17, 2018

(54) INFORMATION PROCESSING APPARATUS, SET VALUES UPDATE METHOD FOR THE SAME, AND RECORDING MEDIUM

(71) Applicant: KONICA MINOLTA, INC., Chiyoda-ku, Toyko (JP)

(72) Inventors: Hiroshi Sugiura, Toyokawa (JP); Hiroki Ueda, Toyohashi (JP); Junichi Isamikawa, Hino (JP); Akihiko Oda, Toyohashi (JP); Mitsuharu Nagai, Okazaki (JP)

(73) Assignee: KONICA MINOLTA, INC., Tokyo (JP)

(*) Notice: Subject to any disclaimer, the term of this patent is extended or adjusted under 35 U.S.C. 154(b) by 171 days.

(21) Appl. No.: 14/624,440

(22) Filed: Feb. 17, 2015

(65) Prior Publication Data
US 2015/0234649 A1 Aug. 20, 2015

(30) Foreign Application Priority Data

Feb. 18, 2014 (JP) ................................. 2014-029004

(51) Int. Cl.
G06F 9/44 (2018.01)
G06F 8/65 (2018.01)
G06F 8/71 (2018.01)

(52) U.S. Cl.
CPC . G06F 8/65 (2013.01); G06F 8/71 (2013.01)

(58) Field of Classification Search
CPC .................. G06F 8/71; G06F 8/70; G06F 8/68
(Continued)

(56) References Cited

U.S. PATENT DOCUMENTS 5,577,244 A * 11/1996 Killebrew ................ G06F 8/65
707/999.202
6,016,107 A * 1/2000 Kampe ................ H04W 8/245
340/4.51
(Continued)

FOREIGN PATENT DOCUMENTS

JP 2000137604 A 5/2000
JP 4021407 B2 12/2007
JP 4577162 B2 11/2010

OTHER PUBLICATIONS

Japanese Office Action (and English translation thereof) dated Jan. 26, 2016, issued in counterpart Japanese Application No. 2014-029004.
(Continued)

Primary Examiner — Wei Zhen
Assistant Examiner — Brahim Bourzik
(74) Attorney, Agent, or Firm — Holtz, Holtz & Volek PC

(57) ABSTRACT

An information processing apparatus includes: a program receiver that receives a new program externally, the new program for updating of an existing program; a set values receiver that receives new set values externally, the new set values including version information, the version information identifying the version of program linked to the new set values; a version judgment portion that judges whether or not the version information included in the new set values matches a current program currently installed or the new program to be installed, the new program being received by the program receiver; and an update portion that updates all the set values if the version information matches the current or new program, or only some of the set values if the version information does not match the current or new program.

12 Claims, 9 Drawing Sheets

(58) Field of Classification Search
USPC .......................................... 717/168, 170, 172
See application file for complete search history.

(56) References Cited

U.S. PATENT DOCUMENTS

| | | | |
|---|---|---|---|
| 7,231,410 B1* | 6/2007 | Walsh | G06F 8/71 |
| 7,571,262 B2 | 8/2009 | Shibata | |
| 7,814,480 B2 | 10/2010 | Sakuda et al. | |
| 9,823,921 B2* | 11/2017 | Mavinakayanahalli | G06F 8/67 |
| 2001/0029178 A1* | 10/2001 | Criss | G06F 8/65 |
| | | | 455/419 |
| 2005/0132179 A1 | 6/2005 | Glaum et al. | |
| 2006/0048130 A1* | 3/2006 | Napier | G06F 8/65 |
| | | | 717/168 |
| 2008/0301660 A1* | 12/2008 | Rao | G06F 8/65 |
| | | | 717/170 |
| 2009/0307661 A1* | 12/2009 | Vierzba | G06F 8/70 |
| | | | 717/120 |
| 2011/0321028 A1* | 12/2011 | Evans | G06F 8/68 |
| | | | 717/170 |
| 2013/0159991 A1 | 6/2013 | Sato et al. | |
| 2014/0047429 A1* | 2/2014 | Gaither | G06F 8/60 |
| | | | 717/170 |
| 2016/0196135 A1* | 7/2016 | Mavinakayanahalli | G06F 8/67 |
| | | | 717/170 |

OTHER PUBLICATIONS

Extended European Search Report dated Oct. 26, 2015, issued in counterpart European Application No. 15154639.7.
Chinese Office Action (and English translation thereof) dated Oct. 11, 2017 issued in counterpart Chinese Application No. 201510083177.6.

* cited by examiner

| Title of Settings Information | Title of Set Values File | Category |
|---|---|---|
| Address Information | Address.dat | Set values not dependent on version of program |
| Authentication Information | UserInformation.dat | Set values not dependent on version of program |
| Function Settings Information | FuncSetting.dat | Set values dependent on function enhancement |
| Machine Settings Information | EngineSetting.dat | Set values dependent on function enhancement |
| Network Settings Information | NetworkSetting.dat | Set values to be activated by rebooting the image forming apparatus |
| Service Settings Information | ServiceSetting.dat | Set values not affecting ordinary users substantially |

FIG.3

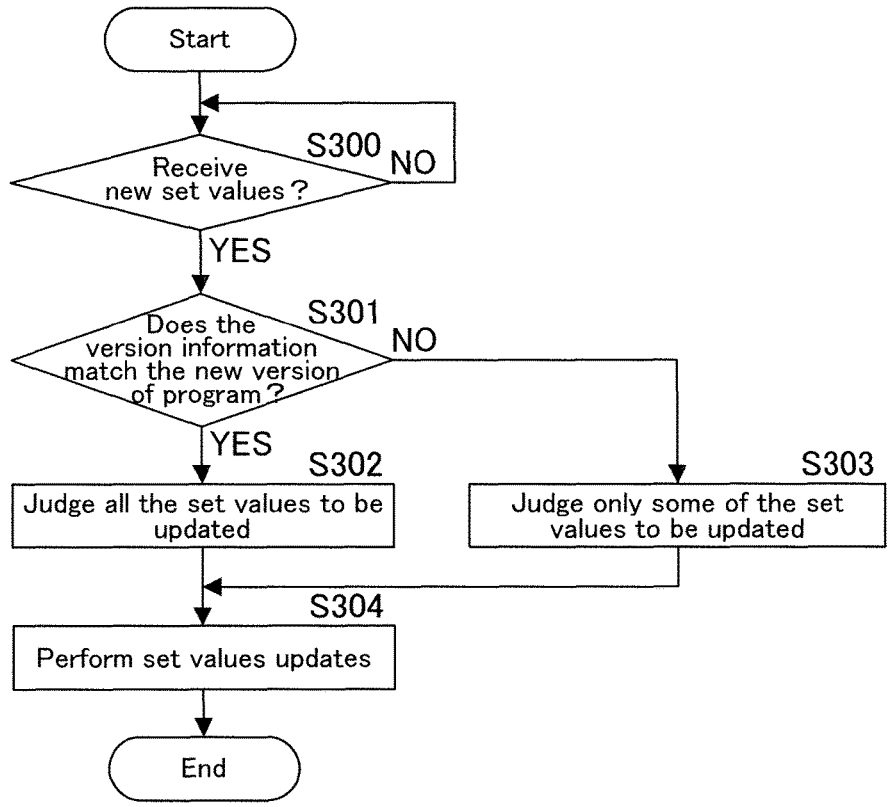

FIG.4

| Title of Settings Information | Minor Version Upgrade | Major Version Upgrade |
|---|---|---|
| Address Information | The set values can be updated prior to a program update | The set values can be updated prior to a program update |
| Authentication Information | The set values can be updated prior to a program update | The set values can be updated prior to a program update |
| Function Settings Information | The set values can be updated prior to a program update | The set values are needed to be updated simultaneously with a program update |
| Machine Settings Information | The set values can be updated prior to a program update | The set values are needed to be updated simultaneously with a program update |

FIG.5

INFORMATION PROCESSING APPARATUS, SET VALUES UPDATE METHOD FOR THE SAME, AND RECORDING MEDIUM

This application claims priority under 35 U.S.C. § 119 to Japanese Patent Application No. 2014-029004 filed on Feb. 18, 2014, the entire disclosure of which is incorporated herein by reference in its entirety.

BACKGROUND OF THE INVENTION

Field of the Invention

The present invention relates to: an information processing apparatus such as a personal computer or an image processing apparatus; a set values update method for the information processing apparatus; and a recording medium.

Description of the Related Art

The following description sets forth the inventor's knowledge of related art and problems therein and should not be construed as an admission of knowledge in the prior art.

It takes so much time and effort to perform a program update and set values updates by working on every information processing apparatus on-site. To solve this problem, there are various methods of performing network updates.

In such a method, it is very common that a software developer prepares a new version of program and a software vendor customizes new set values for their individual customers. As a matter of course, such a new version of program and such new set values are stored on different locations (servers) and thus need to be mutually linked.

According to Japanese Patent No. 4021407, a new version of program and new set values are mutually linked by version information of program and title of settings information. When a user intends to perform set values updates with new set values downloaded from an external server, control is performed such that a new version of program is downloaded depending on the need for a program update.

In Japanese Patent No. 4021407, a new version of program, which has a great volume, is downloaded when a user intends to perform set values updates. This can cause poor levels of performance being achieved specifically during the busy time when users flock to a server. This is an unsolved problem.

Control can be performed such that downloading a new version of program is completely out of synchronization with downloading new set values. This means, a new version of program can be downloaded when users do not flock to a server and this is a possible solution to the above-described problem.

In this possible solution, in a case where there is a time interval between downloading a new version of program and downloading new set values, new set values already downloaded can be used only after a new version of program is downloaded, which causes a failure to make effective use of new set values. This is another unsolved problem.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

A first aspect of the present invention relates to an information processing apparatus including:

a program receiver that receives a new program externally, the new program for updating of an existing program currently installed on the information processing apparatus;

a set values receiver that receives new set values externally, the new set values including version information, the version information identifying the version of program linked to the new set values, the new set values being classified in a plurality of categories;

a version judgment portion that judges, in preparation for set values updates by replacing set values with the new set values received by the set values receiver, whether or not the version information included in the new set values matches a current program currently installed or the new program to be installed, the new program being received by the program receiver; and an update portion that updates all the set values if the version judgment portion judges that the version information matches the current or new program, or only some of the set values if the version judgment portion judges that the version information does not match the current or new program.

A second aspect of the present invention relates to an information processing apparatus including:

a program receiver that receives a new program externally, the new program for updating of an existing program currently installed on the information processing apparatus;

a set values receiver that receives new set values externally, the new set values including version information, the version information identifying the version of program linked to the new set values, the new set values being classified in a plurality of categories;

a version judgment portion that judges, in preparation for disclosure of the new program received by the program receiver and the new set values received by the set values receiver so that other information processing apparatuses can receive them, whether or not the version information included in the new set values matches the new program received by the program receiver; and a disclosure portion that discloses all the new set values if the version judgment portion judges that the version information matches the new program, or only some of the new set values if the version judgment portion judges that the version information does not match the new program.

A third aspect of the present invention relates to a set values update method for an information processing apparatus, including:

receiving a new program externally, the new program for updating of an existing program currently installed on the information processing apparatus;

receiving new set values externally, the new set values including version information, the version information identifying the version of program linked to the new set values, the new set values being classified in a plurality of categories;

judging, in preparation for set values updates by replacing set values with the new set values externally received, whether or not the version information included in the new set values matches a current program currently installed or the new program to be installed, the new program being externally received; and updating all the set values if the version information matches the current or new program, or only some of the set values if the version information does not match the current or new program.

A fourth aspect of the present invention relates to a set values update method for an information processing apparatus, comprising:

receiving a new program externally, the new program for updating of an existing program currently installed on the information processing apparatus;

receiving new set values externally, the new set values including version information, the version information identifying the version of program linked to the new set values, the new set values being classified in a plurality of categories;

judging, in preparation for disclosure of the new program and the new set values both externally received so that other information processing apparatuses can receive them, whether or not the version information included in the new set values matches the new program externally received; and disclosing all the new set values if the version information matches the new program, or only some of the new set values if the version information does not match the new program.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which:

FIG. 3 is a table showing an example of set value items;

FIG. 4 is a flowchart representing a set values update operation to be performed by the information processing apparatus of FIG. 2;

FIG. 5 is a table showing when the set values should be updated in connection with a major program upgrade and a minor program upgrade;

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, some embodiments of the present invention will be described with reference to the accompanying figures.

Figure 1:
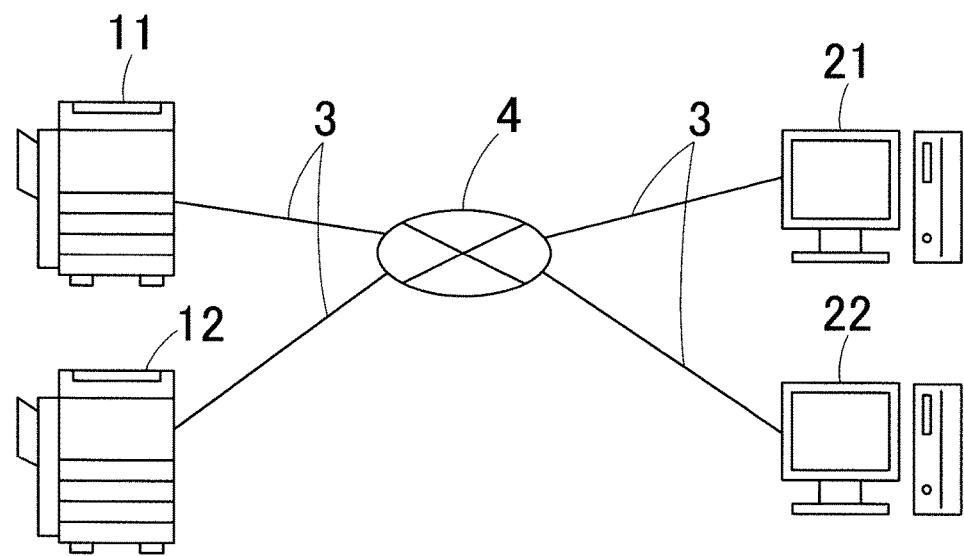
FIG. 1 is a view illustrating a configuration of a network system that includes an information processing apparatus according to one embodiment of the present invention.

FIG. 1 is a view illustrating a configuration of a network system that includes an information processing apparatus according to one embodiment of the present invention.

The network system is provided with a plurality of (two, in this embodiment) image forming apparatuses 11 and 12 as information processing apparatuses and a plurality of (two, in this embodiment) data distribution apparatuses 21 and 22, all of which are connected to each other through a network 3 and an external network 4.

In this embodiment, the image forming apparatuses 11 and 12 are multifunctional digital machines which are referred to as Multi-functional Peripherals (MFP) or, alternatively, these may be image processing apparatuses. Yet alternatively, these may be personal computers or others.

The data distribution apparatus 21 is an external server that delivers a new version of control programs to the image forming apparatuses 11 and 12; the data distribution apparatus 22 is an external server that delivers new set values to the image forming apparatuses 11 and 12.

Figure 2:
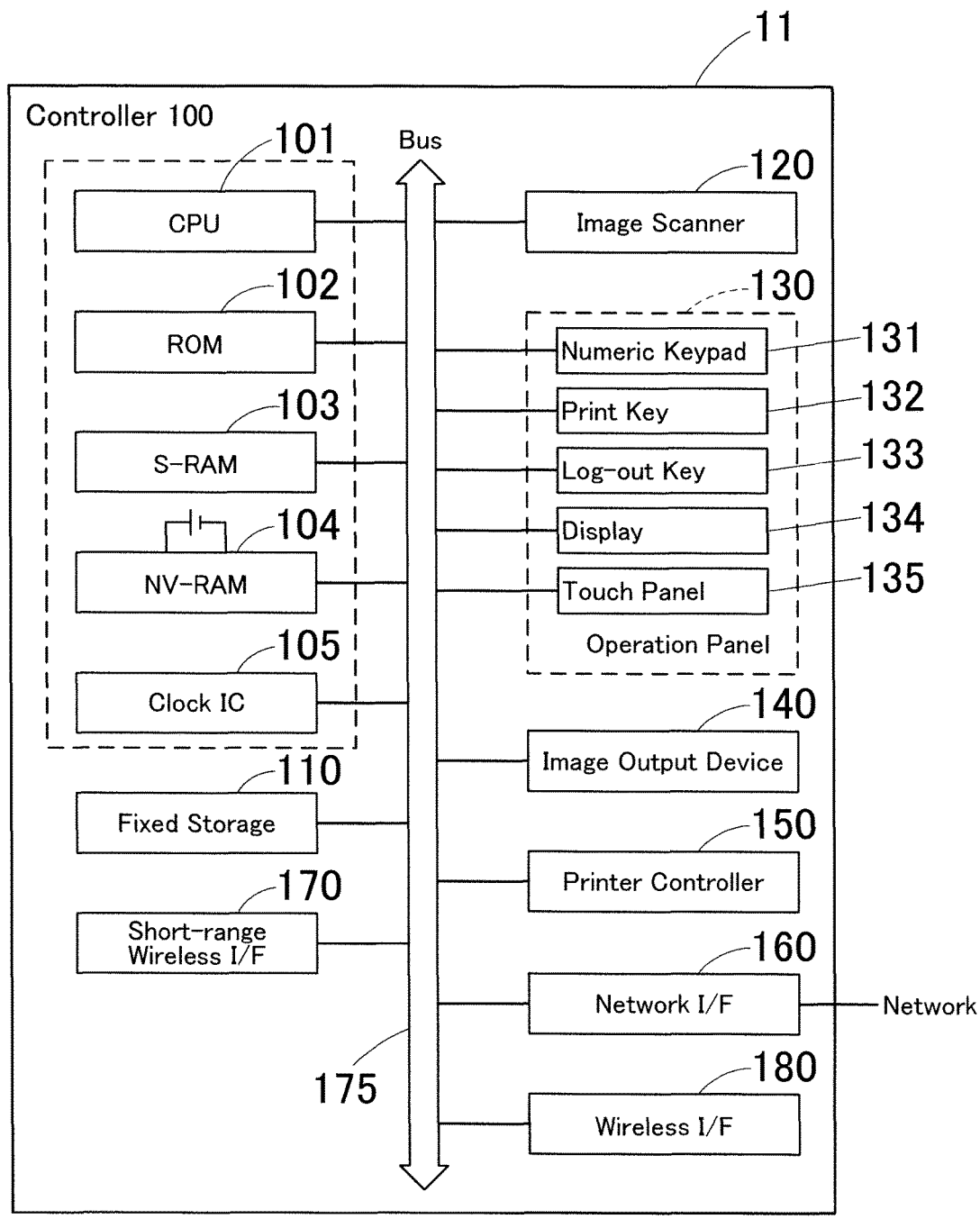
FIG. 2 is a block diagram illustrating an electrical configuration of an image forming apparatus.

FIG. 2 is a block diagram illustrating an electrical configuration of the image forming apparatuses 11 and 12. Since the image forming apparatuses 11 and 12 have an identical configuration, the image forming apparatus 11 will be described as a representative of the both unless otherwise noted and details of the image forming apparatus 12 will be omitted.

As illustrated in FIG. 2, the image forming apparatus 11 is provided with: a controller 100; a fixed storage 110; an image scanner 120; an operation panel 130; an image output device 140; a printer controller 150; a network interface (network I/F) 160; a short-range wireless interface (short-range wireless I/F) 170; and a wireless interface (wireless I/F) 180, all of which are connected to each other via a system bus 175.

The controller 100 is provided with: a CPU 101; a ROM 102; a static random access memory (S-RAM) 103; a NV-RAM 104; a clock IC 105; and others.

The CPU 101 controls the image forming apparatus 11 in a unified and systematic manner by executing control programs stored on a recording medium such as the ROM 102. In this embodiment, the CPU 101 allows downloading a new program for updating of an existing program (hereinafter referred to as a "new version of program") from the data distribution apparatus 21 and new set values from the data distribution apparatus 22 via the network interface 160 and the network and allows also performing a program update and set values updates. Furthermore, the CPU 101 judges, in preparation for set values updates, whether or not version information included in the new set values matches the new version of program and also updates all the set values or only some of the set values which belong to certain categories, depending on the result of the judgment. This will be later described in details.

The ROM 102 stores programs to be executed by the CPU 101 and stores other data.

The S-RAM 103 stores programs and data for executing the programs on a temporal basis, serving as a work area for the CPU 101 to execute the programs.

The NV-RAM 104 is a battery backed-up non-volatile memory; the NV-RAM 104 stores various settings and others for image forming.

The clock IC 105 measures a period of time for processing and others, serving as an internal timer.

The fixed storage 110, which consists of a hard disk drive and others, stores programs, various data objects, and others.

The image scanner 120, which is provided with a scanner and others, obtains a document image by scanning a document put on a platen and converts the obtained document image into image data.

The operation panel 130 serves as a user interface for giving job and other instructions to the image forming apparatus 11 and performing various settings of the same. The operation panel 130 is provided with: a numeric keypad 131; a print key 132; a log-out key 133; a display 134; a touch panel 135; and others.

The numeric keypad 131 serves for performing various settings; the print key 132 serves for giving print instructions; the log-out key 133, which can be pressed by users, serves for logging out after using the image forming apparatus 11.

The display 134, which consists of a liquid-crystal screen for example, displays messages, various operation screens, and others.

The touch panel 135 covers the surface of the display screen of the display 134 to detect user touch events on the display screen.

The image output device 140 transfers toner images on paper.

The printer controller 150 forms toner images on the basis of print data received by the network interface 160.

The network interface (network I/F) 160 serves as a communicator that transmits and receives data to and from external apparatuses such as the data distribution apparatuses 21 and 22 and other image forming apparatuses; specifically, the network interface 160 receives a new version of program and new set values from the data distribution apparatuses 21 and 22.

The short-range wireless interface 170 serves for short-range wireless communications with portable terminal apparatuses, for example; the wireless interface (wireless I/F) 180 serves for wireless communications with the network 4 or with portable terminal apparatuses, for example. The short-range wireless communication system may be, for example, Bluetooth or an infrared communication system referred to as infrared data association (IrDA).

The control programs stored on the ROM 102 can be updated with new versions of control programs downloaded from the data distribution apparatus 21 as described above; the set values stored on the NV-RAM 104 and the fixed storage 110 can be updated with new set values downloaded from the data distribution apparatus 22 also as described above.

There are some categories of set values as exemplified in FIG. 3.

The table of FIG. 3 contains set values classified in the following categories: program version-independent set values that are not dependent on version of program; function enhancement-dependent set values that are dependent on program function enhancement (due to function improvement or added functions); reboot requiring set values that are to be activated by rebooting (restarting) the image forming apparatus 11; and basic set values that do not affect ordinary users substantially. Every set value is accompanied by the category it belongs to.

As an example of the program version-independent set values, there are address information such as network scan addresses and facsimile addresses and authentication information including user name and password, which is required for authentication for use of the image forming apparatus 11. The program version-independent set values are never affected by function enhancement of a program update.

As an example of the function enhancement-dependent set values, there are function settings information including default settings of functions (color, staple, and others) and machine settings information including default settings of the image forming apparatus 11 (period of time before sleep mode, language, and others). There may be additional function enhancement-dependent set values because of function enhancement of a program update.

As an example of the reboot requiring set values, there is network settings information including various settings for network connection. The image forming apparatus 11 needs to be rebooted to activate new network settings.

As an example of the basic set values, there is service settings information for a service engineer to remotely control the image forming apparatus 11. Although the service settings information is very important for service engineers, it is not for ordinary users who do not mind having late updates of such information.

New set values include version information that matches a version of program, which is not shown in this figure. By examining the version information, the image forming apparatus 11 is allowed to identify the version of program linked to the new set values.

Hereinafter, a set values update operation to be performed by the image forming apparatus 11 will be described with reference to the flowchart of FIG. 4. The flowchart of FIG. 4 and the other flowcharts of the following figures are executed by the CPU 101 of the image forming apparatus 11 in accordance with the control programs stored on a recording medium such as the ROM 102.

In Step S300, it is judged whether or not new set values are received (downloaded) from the data distribution apparatus 22. Such a judgment depends on whether or not there are new set values in a temporal memory area because new set values are normally stored thereon upon being received.

If new set values are not received yet (NO in Step S300), the routine waits until these are received. If new set values are received already (YES in Step S300), the version information is compared in Step S301. New set values, as described above, normally include version information that identifies the version of program linked to the new set values. In a case where there is a new version of program to be installed which is received from the data distribution apparatus 21, the version information of the new set values is compared to the new version of program and thereby it is judged whether or not the version information matches the new version of program. In a case where there is not a new version of program received therefrom, the version information of the new set values is compared to the version of program currently installed.

If the version information matches the new version of program as a result of comparison (YES in Step S301), all the set values are judged to be updated with the new set values in Step S302, then the routine proceeds to Step S304. If the version information does not match the new version of program as a result of comparison (NO in Step S301), only some of the set values received therefrom are judged to be updated in Step S303, then the routine proceeds to Step S304. Specifically, the set values judged to be updated in this step belong to the category for program version-independent set values such as address information and authentication information.

In Step S304, the set values judged to be updated are updated. Upon a set values update, the new set values are copied from the temporal memory area to the main memory area, which means that the new set values are not stored anymore on the temporal memory area. In a case where there is a new version of program to be installed, a program update and set values updates are performed simultaneously.

As described above, version information included in new set values is compared to the version of program currently installed or a new version of program to be installed which is downloaded from the data distribution apparatus 21. If the version information matches either of them, all the set values are updated; if the version information matches neither of them, only some of the set values which belong to the category for program version-independent set values are updated. In this way, all the set values or only some of the set values, at least, can be updated soon. This can ensure in making effective use of new set values even in a case where there is a time interval between downloading new set values and downloading a new version of program.

Hereinafter, another operation of the image forming apparatus 11 will be described in details. In this embodiment, different set values depending on the type of program upgrade are judged to be updated.

Program updates serves for program version upgrades. The following are two principal types of program version upgrades: minor version upgrades aimed at bug fixes; and major version upgrades aimed at function enhancement in addition to bug fixes.

As indicated in the table of FIG. 5, upon a major version upgrade for function enhancement, the function enhancement-dependent set values such as function settings information and machine settings information are needed to be updated simultaneously with a program update; upon a minor version upgrade simply for bug fixes, all the set values can be updated prior to a program update.

Meanwhile, the program version-independent set values such as address information and authentication information can be updated prior to a program update, not depending on whether it is a major version upgrade or a minor version upgrade.

Figure 6:
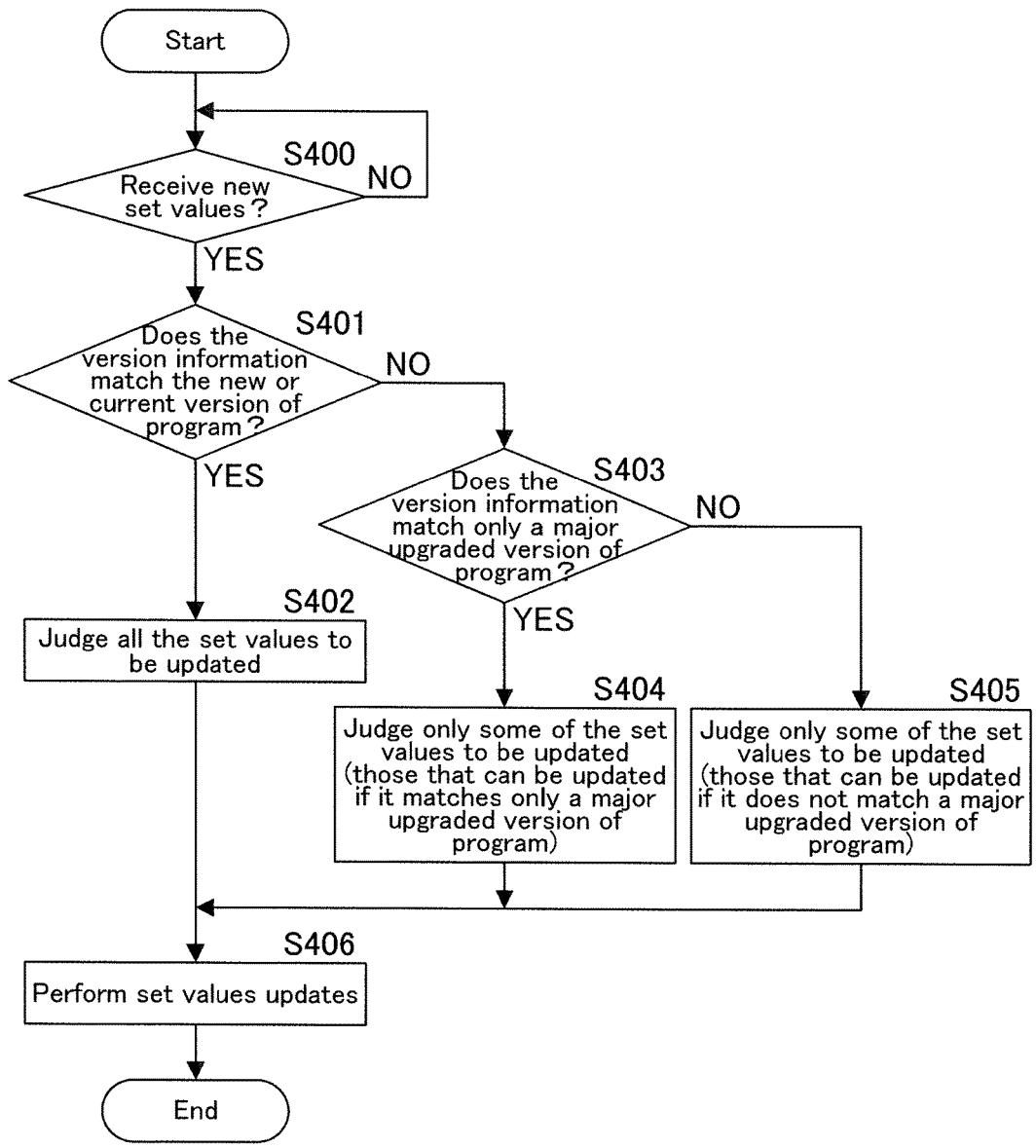
FIG. 6 is a flowchart representing another set values update operation to be performed by the information processing apparatus.

Different set values can be updated depending on whether or not the version information matches both of a major upgraded version of program and a minor upgraded version of program. Such an operation will be described in details with reference to the flowchart of FIG. 6.

In Step S400, it is judged whether or not new set values are received (downloaded) from the data distribution apparatus 22. If new set values are not received yet (NO in Step S400), the routine waits until these are received. If new set values are received already (YES in Step S400), the routine proceeds to Step S401, in which: in a case where there is a new version of program to be installed which is received from the data distribution apparatus 21, version information included in the new set values is compared to the new version of program; and in a case where there is not a new version of program received therefrom, the version information of the new set values is compared to the version of program currently installed. In this embodiment, the version information of the new set values is compared to a major upgraded version of program and to a minor upgraded version of program and thereby it is judged whether or not the version information matches both of major and minor upgraded versions of program.

If the version information matches both of them as a result of comparison (YES in Step S401), all the set values are judged to be updated with the new set values in Step S402, then the routine proceeds to Step S406. If the version information does not match both of major and minor upgraded versions of program as a result of comparison (NO in Step S401), then it is judged in Step S403 whether or not the version information matches a major upgraded version of program, in other words, whether the version information matches only a major upgraded version of program or neither of them.

If the version information matches only a major upgraded version of program (YES in Step S403), only some of the set values (which can be updated if the version information matches only a major upgraded version of program) are judged to be updated in Step S404. In this case, the version information does not match a minor upgraded version of program aimed at bug fixes. Since no minor upgraded version of program is aimed at function enhancement, the program version-independent set values such as address information and authentication information and the program version-dependent set values such as function settings information and machine configuration information are judged to be updated.

Back to Step S403, if the version information does not match a major upgraded version of program (NO in Step S403), this naturally means that the version information does not match a minor upgraded version of program, neither. Thus only some of the set values (which can be updated if the version information does not match a major upgraded version of program) are judged to be updated in Step S405, then the routine proceeds to Step S406. That is, in this case, while the function enhancement-dependent set values such as function settings information and machine configuration information are judged not to be updated, the function enhancement-independent set values such as address information and authentication information are judged to be updated.

In Step S406, the set values judged to be updated are updated.

As described above, in this embodiment, version information included in new set values is compared to a new version of program to be installed or a new version of program currently installed. If the version information matches both of major and minor upgraded versions of program, all the set values are updated; if the version information matches neither of major and minor upgraded versions of program, only the program version-independent set values are updated; if the version information matches a major upgraded version of program and does not match a minor upgraded version of program, the program version-independent set values and the function enhancement-dependent set values are updated. This can ensure in making effective use of new set values on the basis of the type of program upgrade.

Figure 7:
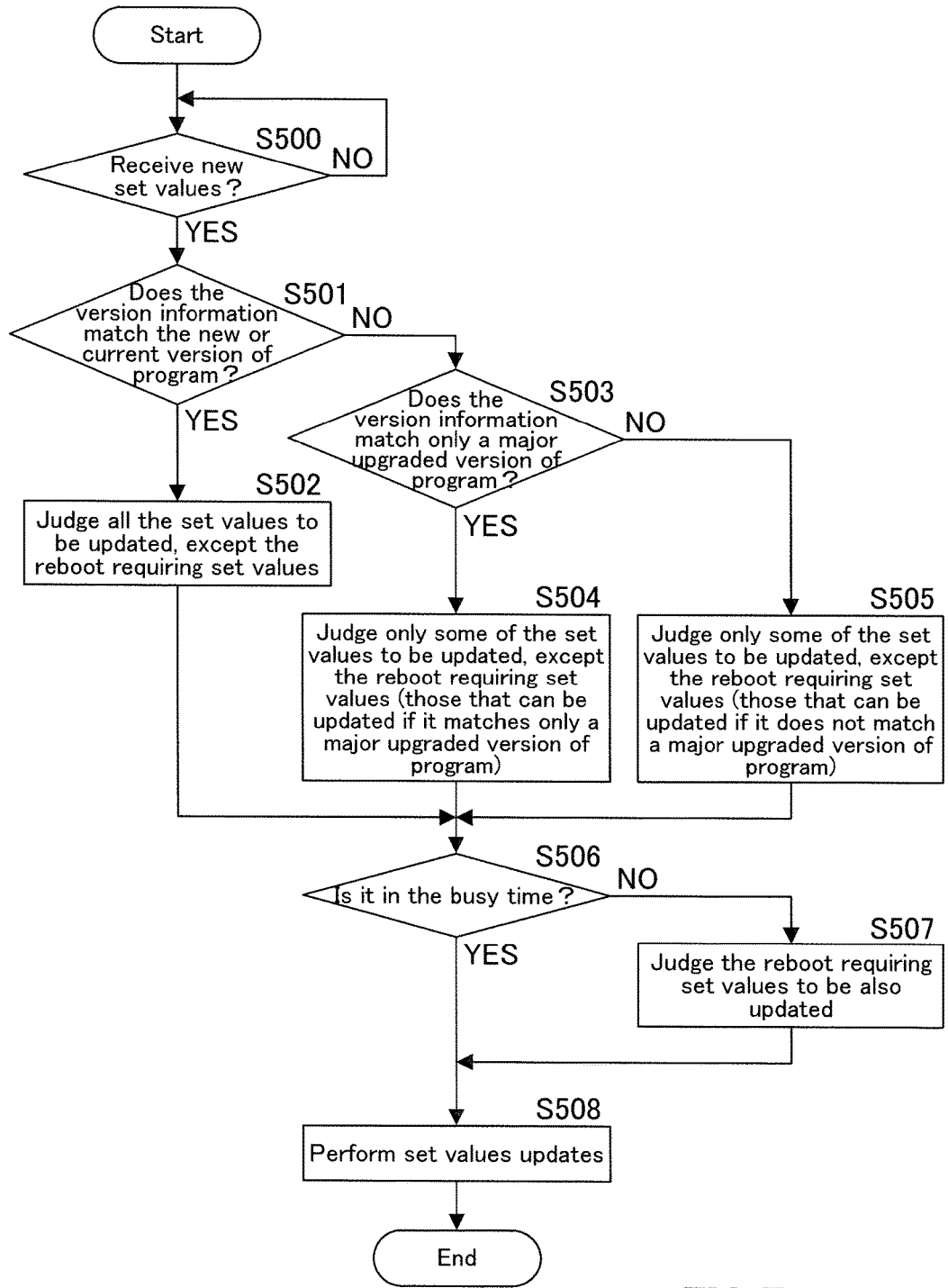
FIG. 7 is a flowchart representing yet another set values update operation to be performed by the information processing apparatus.

FIG. 7 is a flowchart representing yet another operation of the image forming apparatus 11.

Some of the already downloaded new set values may belong to the category for reboot requiring set values to be activated by rebooting the image forming apparatus 11, such as network settings information, as mentioned in FIG. 3. In such a case, users cannot use the image forming apparatus 1 until it recovers from a reboot thus it takes time to finish set values updates. To solve this problem, in this embodiment, the reboot requiring set values can be updated depending on whether or not it is in a period of time set in advance as the busy time when users flock to download.

In Step S500 of FIG. 7, it is judged whether or not new set values are received (downloaded) from the data distribution apparatus 22. If new set values are not received yet (NO in Step S500), the routine waits until these are received. If new set values are received already (YES in Step S500), the routine proceeds to Step S501, in which: in a case where there is a new version of program to be installed which is received from the data distribution apparatus 21, version information included in the new set values is compared to the new version of program; and in a case where there is not a new version of program received therefrom, the version information of the new set values is compared to the version of program currently installed. That is, in this embodiment, the version information of the new set values is compared to a major upgraded version of program and to a minor upgraded version of program.

If the version information matches both of them as a result of comparison (YES in Step S501), all the set values are judged to be updated with the new set values, except the reboot requiring set values, in Step S502, then the routine proceeds to Step S506. If the version information does not match both of major and minor upgraded versions of program as a result of comparison (NO in Step S501), then it is judged in Step S503 whether or not the version information matches a major upgraded version of program, in other words, whether the version information matches only a major upgraded version of program or neither of them.

If the version information matches only a major upgraded version of program (YES in Step S503), only some of the set values (which can be updated if the version information matches only a major upgraded version of program) are judged to be updated, except the reboot requiring set values, in Step S504. In this case, the version information does not match a minor upgraded version of program aimed at bug fixes. Since no minor upgraded version of program is aimed at function enhancement, the program version-independent set values such as address information and authentication information and the program version-dependent set values such as function settings information and machine configuration information are judged to be updated.

Back to Step S503, if the version information does not match a major upgraded version of program (NO in Step S503), this naturally means that the version information does not match a minor upgraded version of program, neither. Thus only some of the set values (which can be updated if the version information does not match a major upgraded version of program) are judged to be updated in Step S505, then the routine proceeds to Step S506. That is, in this case, while the function enhancement-dependent set values such as function settings information and machine configuration information are judged not to be updated, the function enhancement-independent set values such as address information and authentication information are judged to be updated.

In Step S506, it is judged whether or not it is in a period of time set in advance as the busy time. If it is in the busy time (YES in Step S506), the routine proceeds to Step S508. In this case, the reboot requiring set values are not updated. If it is not in the busy time (NO in Step S506), the reboot requiring set values are judged to be also updated in Step S507, then the routine proceeds to Step S508.

In Step S508, the set values judged to be updated are updated.

As described above, in this embodiment, if it is not in the busy time, the reboot requiring set values are also updated; if it is time in the busy time, the reboot requiring set values are not updated. Users are not bothered anymore by being unable to use the image forming apparatus 11 until it recovers from a reboot. This can ensure in making effective use of new set values.

Figure 8:
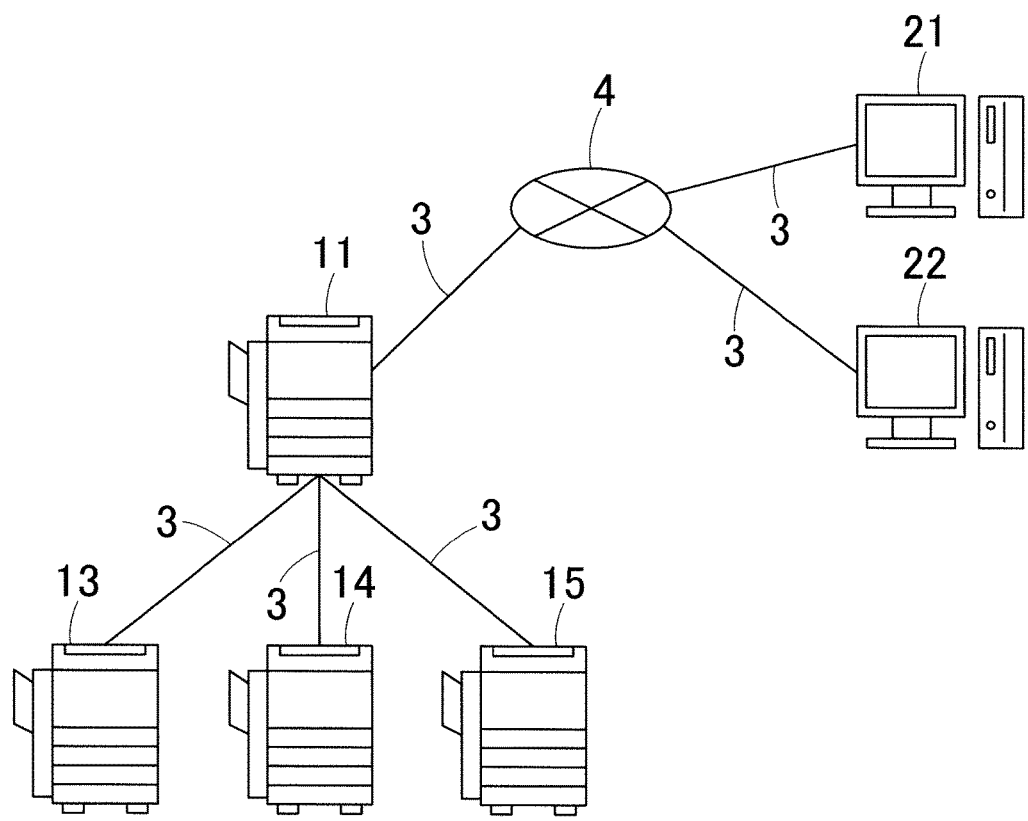
FIG. 8 illustrates a configuration of a network system that includes an information processing apparatus according to another embodiment of the present invention.

FIG. 8 is a view illustrating a configuration of a network system that includes the image forming apparatus 11 as an information processing apparatus according to another embodiment of the present invention.

In this embodiment, the image forming apparatus 11 serves as a server. This image forming apparatus 11 discloses a new version of program downloaded from the data distribution apparatus 21 and new set values downloaded from the data distribution apparatus 22 by storing them on a memory area that can be accessed from other image forming apparatuses 13 to 15 each serving as a terminal (each being linked to the server). The image forming apparatus 13 to 15 download the disclosed information from the image forming apparatus 11 through the network 3 and performs update operations.

The image forming apparatus 11, which serves as a server in this embodiment, is connected to the data distribution apparatuses 21 and 22 through the network 3 and the external network 4 in the same way as illustrated in FIG. 1. As a matter of course, this image forming apparatus 11 has an electrical configuration as illustrated in FIG. 2.

Figure 9:
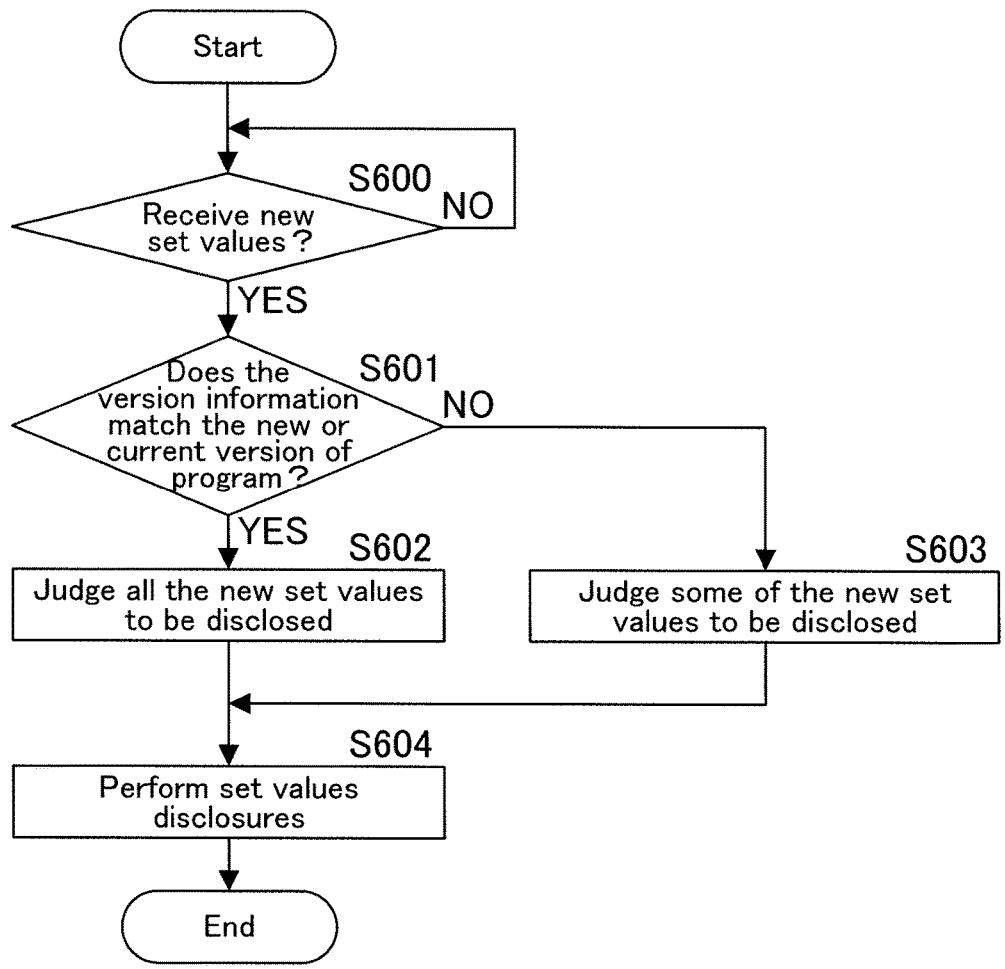
FIG. 9 is a flowchart representing an operation of an information processing apparatus employed in the network system of FIG. 8.

FIG. 9 is a flowchart representing an operation of the image forming apparatus 11 serving as a server in the network system of FIG. 8.

In Step S600, it is judged whether or not new set values are received (downloaded) from the data distribution apparatus 22. If new set values are not received yet (NO in Step S600), the routine waits until these are received. If new set values are received already (YES in Step S600), version information included in the new set values is compared to a new version of program downloaded from the data distribution apparatus 21, in Step S601.

If the version information matches the new version of program as a result of comparison (YES in Step S601), all the new set values received therefrom are judged to be disclosed in Step S602, then the routine proceeds to Step S604. If the version information does not match the new version of program as a result of comparison (NO in Step S601), only some of the new set values received therefrom are judged to be disclosed in Step S603, then the routine proceeds to Step S604. Specifically, the new set values judged to be disclosed in this step belong to the program version-independent categories, such as address information and authentication information.

In Step S604, the new set values judged to be disclosed are disclosed.

The image forming apparatuses 13 to 15 as terminals access the image forming apparatus as a server on a regular basis to check if there are a new version of program and new set values disclosed. If there are, the image forming apparatuses 13 to 15 download them to perform update operations.

As described above, the image forming apparatus 11 discloses a new version of program and new set values downloaded from the data distribution apparatuses 21 and 22, respectively, so that the other image forming apparatuses 13 to 15 can download them. In such a case, if the version information of the new set values matches the new version of program, all the new set values are disclosed; if the version information does not match the new version of program, only some of the new set values are disclosed. In this way, the other image forming apparatuses 13 to 15 can download the new version of program and the new set values to perform update operations. This can ensure in making effective use of new set values.

Hereinafter, another operation of the image forming apparatus 11 will be described in details. In this embodiment, different new set values depending on the type of program upgrade can be disclosed.

Figure 10:
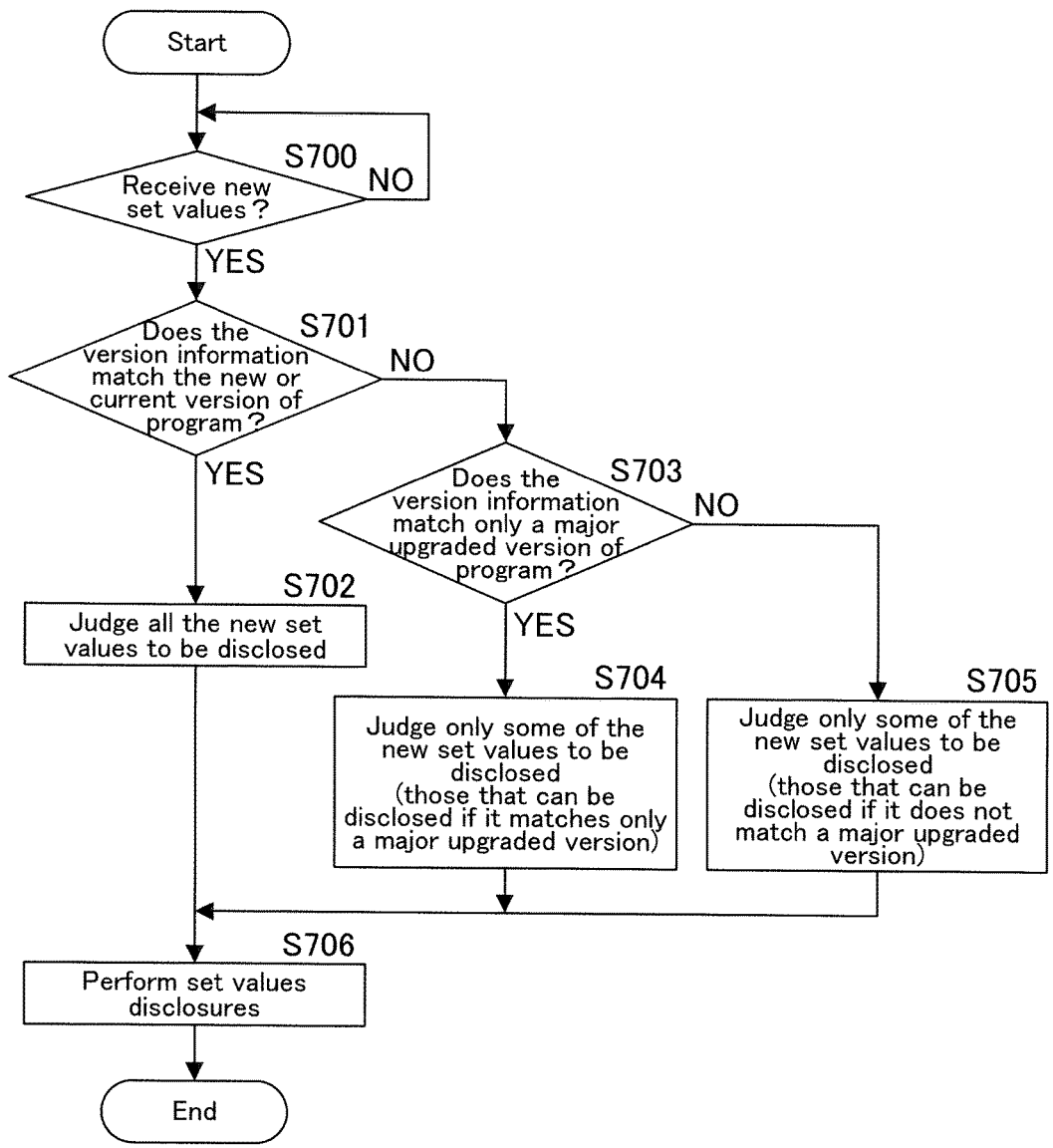
FIG. 10 is a flowchart representing another operation of an information processing apparatus employed in the network system of FIG. 8.

Such an operation of the image forming apparatus 11 will be described in details with reference to the flowchart of FIG. 10.

In Step S700, it is judged whether or not new set values are received (downloaded) from the data distribution apparatus 22. If new set values are not received yet (NO in Step S700), the routine waits until these are received. If new set values are received already (YES in Step S700), version information included in the new set values is compared to a new version of program downloaded from the data distribution apparatus 21, in Step S701. In this embodiment, the version information of the new set values is compared to a major upgraded version of program and to a minor upgraded version of program and thereby it is judged whether or not the version information matches both of major and minor upgraded versions of program.

If the version information matches both of them as a result of comparison (YES in Step S701), all the new set values received therefrom are judged to be disclosed in Step S702, then the routine proceeds to Step S706. If the version information does not match both of major and minor upgraded versions of program as a result of comparison (NO in Step S701), then it is judged in Step S703 whether or not the version information matches a major upgraded version of program, in other words, whether the version information matches only a major upgraded version of program or neither of them.

If the version information matches only a major upgraded version of program (YES in Step S703), only some of the new set values (which can be disclosed if the version information matches only a major upgraded version of program) are judged to be disclosed, in Step S704. In this case, a minor upgraded version of program aimed at bug fixes is judged to be disclosed. Since no minor upgraded version of program is aimed at function enhancement, the program version-independent new set values such as address information and authentication information and the program version-dependent new set values such as function settings information and machine configuration information are judged to be disclosed.

Back to Step S703, if the version information does not match a major upgraded version of program (NO in Step S703), this naturally means that the version information does not match a minor upgraded version of program, neither. Thus only some of the new set values (which can be disclosed if the version information does not match a major upgraded version of program) are judged to be disclosed in Step S705, then the routine proceeds to Step S706. That is, in this case, while the function enhancement-dependent new set values as function settings information and machine configuration information are judged not to be disclosed, the function enhancement-independent new set values such as address information and authentication information are judged to be disclosed.

In Step S704, the new set values judged to be disclosed are disclosed.

As described above, in this embodiment, version information included in new set values is compared to a new version of program to be installed. If the version information matches both of major and minor upgraded versions of program, all the new set values are disclosed; if the version information matches neither of major and minor upgraded versions of program, only the program version-independent new set values are disclosed; if the version information matches a major upgraded version of program and does not match a minor upgraded version of program, the program version-independent new set values and the function enhancement-dependent new set values are disclosed. The other image forming apparatuses 13 to 15 as terminals can ensure in making effective use of new set values on the basis of the type of program upgrade.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An information processing apparatus comprising:
 a network interface; and
 a hardware processor configured to:
  receive, via the network interface, (i) a new program for updating an existing program and (ii) new set values, the new set values including version information identifying a program version, the program version being linked to the new set values, and the new set values being classified into a plurality of categories;
  judge whether or not a program matching the program version identified by the version information included in the new set values has already been received in preparation for performing set values updates, the set values updates being performed by replacing current set values with the new set values; and update all of the current set values when it is judged that the program has already been received, and update only some of the current set values when it is judged that the program has not yet been received, wherein:

the hardware processor judges that the program has already been received when the existing program or the new program which has been received but not yet installed on the information processing apparatus matches the program version identified by the version information included in the new set values;

at least one of the plurality of categories is a category to which program version-independent set values belong, the program version-independent set values not depending on program version, and at least one of the plurality of categories is a category to which function enhancement-dependent set values belong, the function enhancement-dependent values being related to function enhancement;

the new program is one of a major upgraded program and a minor upgraded program, the major upgraded program being a program related to function enhancement, and the minor upgraded program being a program related to bug fixes;

the hardware processor is further configured to judge whether the version information matches (i) both of the major and minor upgraded programs, (ii) neither of the major and minor upgraded programs, or (iii) only the major upgraded program; and the hardware processor is further configured to (i) update all of the set values when it is judged that the version information matches both of the major and minor upgraded programs, (ii) update only the program version-independent set values when it is judged that the version information matches neither of the major and minor upgraded programs, and (iii) update the program version-independent set values and the function enhancement-dependent set values when it is judged that the version information matches only the major upgraded program.

2. The information processing apparatus as recited in claim 1, wherein:

the hardware processor is further configured to update only the program version-independent set values when the hardware processor judges that the existing program and the new program do not match the program version identified by the version information included in the new set values.

3. The information processing apparatus as recited in claim 1, wherein:

at least one of the plurality of categories is a category to which reboot requiring set values belong, the reboot requiring set values requiring a reboot of the information processing apparatus to be activated;

the hardware processor is further configured to judge whether or not a current time is within a predetermined period of time defined as a busy time, in preparation for performing the set values updates; and the hardware processor updates the reboot requiring set values when it is judged that the current time is not within the busy time, and does not update the reboot requiring set values when it is judged that the current time is within the busy time.

4. An information processing apparatus comprising:
a network interface; and
a hardware processor configured to:
receive, via the network interface, (i) a new program for updating an existing program and (ii) new set values, the new set values including version information identifying a program version, the program version being linked to the new set values, and the new set values being classified into a plurality of categories;

judge whether or not a program matching the program version identified by the version information included in the new set values has already been received in preparation for disclosure of the new program and the new set values so that at least one other information processing apparatus can receive the new program and the new set values; and disclose all of the set values when it is judged that the program has already been received, and disclose only some of the set values when it is judged that the program has not yet been received, wherein:

the hardware processor judges that the program has already been received when a program already received at the information processing apparatus matches the program version identified by the version information included in the new set values;

at least one of the plurality of categories is a category to which program version-independent set values belong, the program version-independent set values not depending on program version, and at least one of the plurality of categories is a category to which function enhancement-dependent set values belong, the function enhancement-dependent values being related to function enhancement;

the new program is one of a major upgraded program and a minor upgraded program, the major upgraded program being a program related to function enhancement, and the minor upgraded program being a program related to bug fixes;

the hardware processor is further configured to judge whether the version information matches (i) both of the major and minor upgraded programs, (ii) neither of the major and minor upgraded programs, or (iii) only the major upgraded program; and the hardware processor is further configured to (i) disclose all of the set values when it is judged that the version information matches both of the major and minor upgraded programs, (ii) disclose only the program version-independent set values when it is judged that the version information matches neither of the major and minor upgraded programs, and (iii) disclose the program version-independent set values and the function enhancement-dependent set values when it is judged that the version information matches only the major upgraded program.

5. The information processing apparatus as recited in claim 4, wherein:

the hardware processor is further configured to disclose only the program version-independent set values when the hardware processor judges that the program already received at the information processing apparatus does not match the program version identified by the version information included in the new set values.

6. A set values update method of an information processing apparatus, the method comprising:
receiving (i) a new program for updating an existing program and (ii) new set values, the new program and the new set values being received from a source external to the information processing apparatus, the new set values including version information identifying a program version, the program version being linked to the new set values, and the new set values being classified into a plurality of categories;

judging whether or not a program matching the program version identified by the version information included in the new set values has already been received in preparation for performing set values updates, the set values updates being performed by replacing current set values with the new set values; and updating all of the current set values when it is judged that the program has already been received, and updating only some of the current set values when it is judged that the program has not yet been received, wherein:

it is judged that the program has already been received when the existing program or the new program which has been received but not yet installed on the information processing apparatus matches the program version identified by the version information included in the new set values;

at least one of the plurality of categories is a category to which program version-independent set values belong, the program version-independent set values not depending on program version, and at least one of the plurality of categories is a category to which function enhancement-dependent set values belong, the function enhancement-dependent values being related to function enhancement;

the new program is one of a major upgraded program and a minor upgraded program, the major upgraded program being a program related to function enhancement, and the minor upgraded program being a program related to bug fixes; and the method further comprises:
  judging whether the version information matches (i) both of the major and minor upgraded programs, (ii) neither of the major and minor upgraded programs, or (iii) only the major upgraded program; and
  updating all of the set values when it is judged that the version information matches both of the major and minor upgraded programs, updating only the program version-independent set values when it is judged that the version information matches neither of the major and minor upgraded programs, and updating the program version-independent set values and the function enhancement-dependent set values when it is judged that the version information matches only the major upgraded program.

7. The method as recited in claim 6, wherein:
when it is judged that the existing program and the new program do not match the program version identified by the version information included in the new set values, only the program version-independent set values are updated.

8. The method as recited in claim 6, wherein:
at least one of the plurality of categories is a category to which reboot requiring set values belong, the reboot requiring set values requiring a reboot of the information processing apparatus to be activated;
the method further comprises judging whether or not a current time is within a predetermined period of time defined as a busy time, in preparation for performing the set values updates; and the reboot requiring set values are updated when it is judged that the current time is not within the busy time, and the reboot requiring set values are not updated when it is judged that the current time is within the busy time.

9. A set values update method of an information processing apparatus, the method comprising:
receiving (i) a new program for updating an existing program and (ii) new set values, the new program and the new set values being received from a source external to the information processing apparatus, the new set values including version information identifying a program version, the program version being linked to the new set values, and the new set values being classified into a plurality of categories;

judging whether or not a program matching the program version identified by the version information included in the new set values has already been received in preparation for disclosure of the new program and the new set values so that at least one other information processing apparatus can receive the new program and the new set values; and disclosing all of the set values when it is judged that the program has already been received, and disclosing only some of the set values when it is judged that the program has not yet been received, wherein:

it is judged that the program has already been received when a program already received at the information processing apparatus matches the program version identified by the version information included in the new set values;

at least one of the plurality of categories is a category to which program version-independent set values belong, the program version-independent set values not depending on program version, and at least one of the plurality of categories is a category to which function enhancement-dependent set values belong, the function enhancement-dependent values being related to function enhancement;

the new program is one of a major upgraded program and a minor upgraded program, the major upgraded program being a program related to function enhancement, and the minor upgraded program being a program related to bug fixes; and the method further comprises:
  judging whether the version information matches (i) both of the major and minor upgraded programs, (ii) neither of the major and minor upgraded programs, or (iii) only the major upgraded program; and
  disclosing all of the set values when it is judged that the version information matches both of the major and minor upgraded programs, disclosing only the program version-independent set values when it is judged that the version information matches neither of the major and minor upgraded programs, and disclosing the program version-independent set values and the function enhancement-dependent set values when it is judged that the version information matches only the major upgraded program.

10. The method as recited in claim 9, wherein:
when it is judged that the program already received at the information processing apparatus does not match the program version identified by the version information included in the new set values, only the program version-independent set values are disclosed.

11. The method as recited in claim 6, wherein the method is performed by a hardware processor of the information processing apparatus executing a program stored in a non-transitory computer-readable recording medium.

12. The method as recited in claim 9, wherein the method is performed by a hardware processor of the information processing apparatus executing a program stored in a non-transitory computer-readable recording medium.

* * * * *